Figure 8:
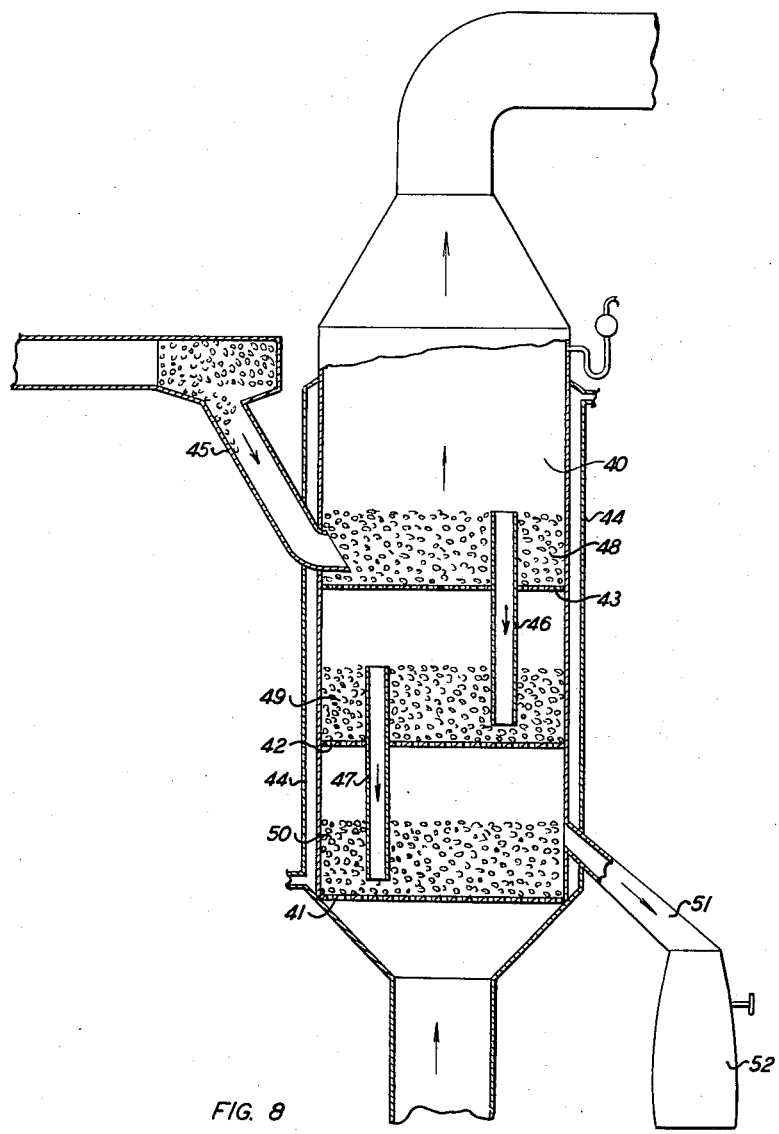

Aug. 25, 1959  W. W. G. HÜBNER ET AL  2,900,668
PRODUCTION OF GRANULAR PERBORATES
Filed Oct. 31, 1956  3 Sheets-Sheet 1
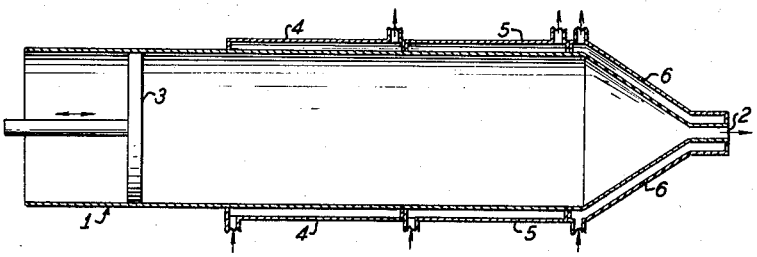
FIG. 1
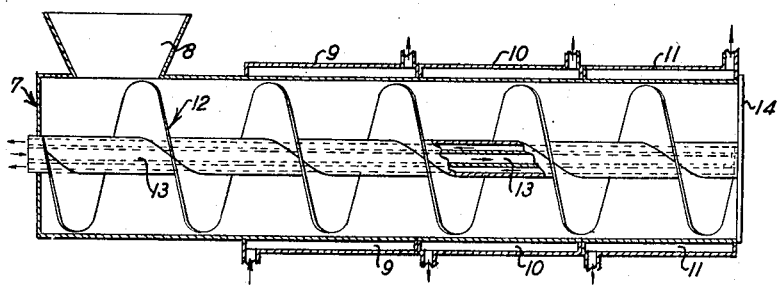
FIG. 2
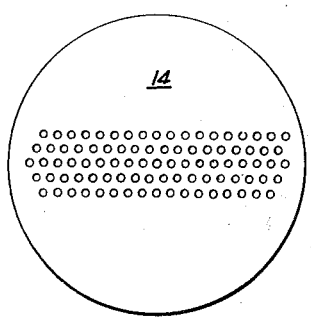
FIG. 3a
  
FIG. 3b  FIG. 3c  FIG. 3d
  
FIG. 3e  FIG. 3f  FIG. 3g
  
FIG. 3h  FIG. 3i  FIG. 3j
  
FIG. 3k  FIG. 3l  FIG. 3m
INVENTOR.
WALTER W. G. HUBNER
ERNST LANGE
ERNST RINDLISBACHER
ATTORNEYS

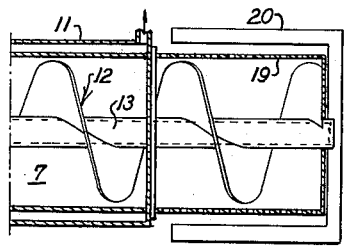
FIG. 5
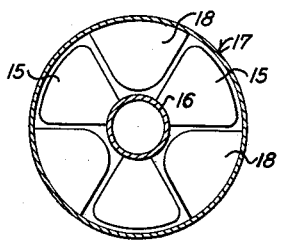
FIG. 4
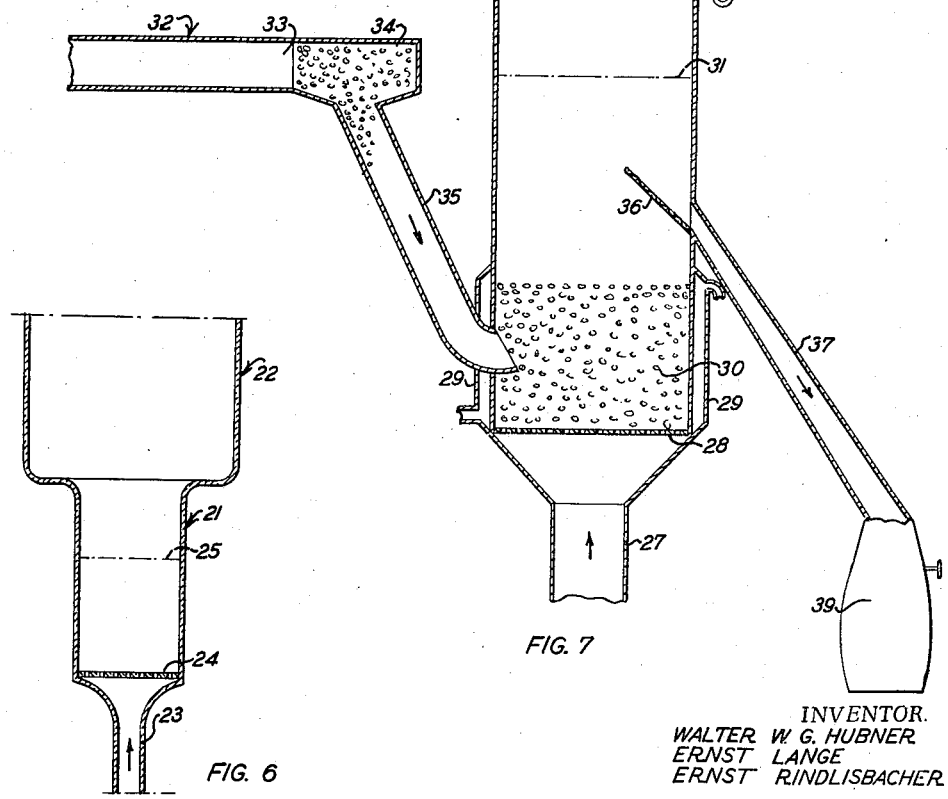
FIG. 6
FIG. 7
INVENTOR.
WALTER W. G. HUBNER
ERNST LANGE
ERNST RINDLISBACHER
ATTORNEY

INVENTOR.
WALTER W. G. HUBNER
ERNST LANGE
ERNST RINDLISBACHER

United States Patent Office 2,900,668
Patented Aug. 25, 1959

2,900,668

PRODUCTION OF GRANULAR PERBORATES

Walter Willi Georg Hübner and Ernst Lange, Pratteln, Basel-Land, and Ernst Rindlisbacher, Pratteln, Switzerland, assignors to Henkel & Cie. A.G., Pratteln, Basel-Land, Switzerland, a corporation of Switzerland Application October 31, 1956, Serial No. 619,529

Claims priority, application Switzerland November 4, 1955

13 Claims. (Cl. 18—47.5)

This invention relates to new and useful improvements in the production of granular perborates.

Perborates are widely used as components of detergents and bleaching powders. Since, however, they are sensitive to rise in temperature, particularly in the presence of water, they are generally not added during production of the powder but only after the powder has been formed.

In recent years, detergents and bleaching agents which have a coarsely granular form have come into widespread use. If the conventional powdered perborates are mixed with the coarsely granular detergents (beads) or bleaching agents, they tend to separate upon transportation and storage due to the difference in particle size.

Various attempts have been made to produce granular perborates which may be readily mixed with the coarsely granular detergents or bleaching agents and which do not tend to separate therefrom. These attempts, however, have not proven altogether satisfactory and generally require the use of elevated temperatures which tend to cause losses of oxygen by superheating.

In accordance with one proposal, the perborates were agglomerated on a heated surface such as a rotating granulation or tabulating table in the manner that a portion of the water of crystallization was driven off and a portion of the perborate particles would be freed of the water of crystallization and would fuse with the other perborate particles which would become melted in the water of crystallization. In this process, however, an extremely careful control of temperature was necessary in order to avoid losses of oxygen by superheating.

One object of this invention is a new and improved process for forming granular perborates from powdered perborate without the above mentioned difficulties. This and still further objects will become apparent from the following description read in conjunction with the drawing in which:

Fig. 1 is a diagrammatic vertical cross section of an apparatus for producing perborates in accordance with the invention on a smaller scale, as for example, for laboratory use, Fig. 2 is a diagrammatic vertical cross section of an embodiment of an extrusion press for producing granular perborates in accordance with the invention on a larger scale, Figs. 3a–3m show plan views of various embodiments of an extrusion plate, and extrusion orifices of the extrusion press of Fig. 2, Fig. 4 is a diagrammatic cross section of a further embodiment of an extrusion press for producing granular perborates in accordance with the invention, Fig. 5 shows a diagrammatic vertical section of the front portion of an extrusion press for producing granular perborates in accordance with the invention provided with a granulating drum and scrapers, Fig. 6 is a diagrammatic vertical section of an embodiment of an apparatus for cooling extruded granular perborate particles in accordance with the invention on a small scale, as for example, laboratory use, Fig. 7 is a diagrammatic vertical section of an embodiment for fluidizing and cooling granulated perborates in accordance with the invention on a larger scale, and Fig. 8 is a diagrammatic vertical cross section of still a further embodiment of cooling granular perborates in a fluidized bed in accordance with the invention which is suitable for commercial production.

In accordance with the invention the finely granular perborates are converted into a more coarsely granular form by converting a finely granular perforate containing water of crystallization into a softened deformable mass under heat and pressure and molding the mass into a structure having its greatest cross sectional size not substantially in excess of the grain size of the granular perborate to be produced and recovering granular perborate from this structure after solidification by cooling.

The conversion of the finely granular perborate into the softened deformable mass is preferably effected in an extrusion press and the deformable mass is preferably extruded into a narrow strand. The strand as it emerges from the extrusion press may be broken up into the granular particles which it subsequently solidifies by cooling or the strand may be solidified by cooling and thereafter broken up into the granular form.

As starting materials, there are used perborates containing water of crystallization, and preferably crystallized sodium perborate of the formula $NaBO_2.H_2O_2.3H_2O$. Partially dehydrated perborates can also be employed provided that these perborates can still be converted into a plastically-deformable mass at temperatures at which damage to the perborates by heating will not occur, as for instance at temperatures of up to 100° C. and preferably up to 75° C. The quantities of water of crystallization contained in such perborates can decrease to such an extent that the quantity of water of crystallization corresponds to an overall formula of $NaBO_2.H_2O_2.1H_2O$.

The temperatures employed for the softening or melting of the perborate depend on the degree of hydration in which the perborates are worked. Sodium perborates having three molecules of water of crystallization can be caused to melt in their own water of crystallization at temperatures within the range of 40 to 65° C. and preferably 48 to 55° C. With a decrease in the water content, the temperatures increase and in the case of perborates of an overall formula of $NaBO_2.H_2O_2.1H_2O$ reach the range of 60–70° C. There can be added to the perborates which are to be worked stabilizers known per se for perborates such as oxides, hydroxides, carbonates, silicates, or other water-insoluble compounds of the alkali earths including magnesium as well as aluminum or tin. These compounds are particularly effective if they are present in very fine distribution, for instance in colloidal state. Since many heavy metals, as for example copper, are very active decomposition catalysts for per compounds, the process is advisedly carried out in apparatus in which the perborate does not come in contact with such metals or their alloys.

While in the known method of operation water of crystallization is to be expelled by heating the perborate, in the method of procedure in accordance with the invention, only a melting is intended, in which connection, however, a substantial loss of water of crystallization is either to be entirely avoided or else kept within such limits that the mass still remains deformable. For this reason, the softening or melting of the perborate should be effected as far as possible in a closed atmosphere, and preferably in a closed vessel.

The extent of the softening or melting can differ greatly depending on the nature of the shaping of the perborate into small structures and extend from just perceptible softening at which a plastic deformability of the material under high pressure is just possible, up to complete melting of the entire mass.

The bulk weight of the perborates to be produced can be controlled by the regulation of the temperature during the pressure and temperature treatment of the perborate. If the temperature is so adjusted that the perborate strands after the temperature and pressure treatment consist essentially of the original perborate crystals which have merely baked together at individual places due to small quantiies of molten perborate crystals, then perborates of low bulk weights are obtained. At a bulk weight of the starting material of an order of magnitude of 550 to 650 grams per liter, it is possible in this way for instance to obtain granular products of bulk weights of 200 to 500 grams per liter and preferably 300 to 400 grams per liter depending on the extent of the softening of the perborate mass. As the free space originally present between the perborate particles is filled up by molten perborate upon increased heating of the perborate, the bulk weight of the final product increases with an increase in temperature and products of bulk weights of 700 to 800 grams per liter can be obtained.

For the shaping of the perborate mass in coherent structures which are of small size at least in one dimension, there may be used any apparatus in connection which will cause the movement of the perborate mass while simultaneously exert the pressure on said mass, and preferably an extrusion press. The principle of the method can also be noted from the apparatus shown in Figure 1 which has proven suitable also for the carrying out of laboratory experiments. The apparatus consists of a cylinder 1 which is open at one side and has a small outlet opening 2 at the other side. In the cylinder 1, there is a movable piston 3. The cylinder is provided with a temperature jacket which, as shown in Figure 1, can be divided up into several sections 4, 5 and 6 so that the different places of the cylinder can be heated or cooled in different manners as desired. If the cylinder is filled with powdered perborate, and the perborate placed under pressure by means of the plunger and if the perborate mass is then heated by means of a heating agent conducted through the tempering jackets, the perborate will start to melt and upon the reaching of a sufficiently high pressure or a corresponding degree of softening will emerge through the small opening 2 as a more or less deliquescent strand. The cross-section of this opening and the degree of softening of the perborate are now so adapted to each other that the emerging strand no longer deliquesces on its own and upon solidification essentially retains the shape which it was imparted by the outlet opening.

Screw presses of the known type have proven suitable for the industrial carrying out of the method. Figure 2 shows such a screw press, the cylinder 7 of which bears the inlet hopper 8 on the entrance side. The cylinder is surrounded by temperature jackets 9, 10 and 11. In the cylinder is provided a rotatable screw 12, the hollow shaft 13 of the screw provides a passage for heating or cooling agent. The pitch of the screw can, as shown in Figure 2, be the same over the entire length of the screw, but it may also vary and become smaller preferably in the direction of conveyance. When the perborate is worked in screw presses at times a greater or lesser amount of frictional heat is produced which causes a softening of the perborate mass so that additional heating can be entirely or partially dispensed with. The outlet end of the screw is closed by a die 14 which is shown in plan view in Figure 3. In this die, there are openings through which the perborate is forced out. It is advisable to arrange the openings as close as possible to each other so that the emerging strands of perborate will lie alongside of each other on a base without contacting each other and sticking together. Depending on the consistency with which the perborate comes out from the opening, several rows of such openings may however be arranged above one another. The openings may for instance be of cylindrical, semicylindrical, hollow cylindrical, prismatic or star-shaped cross-section. The die can be provided with a special temperature device.

Screw presses, the screw of which is broken up into individual blades 15 fastened to the hollow shaft 16 as shown in Fig. 4 have been found particularly suitable. The inside of the cylindrical housing 17 is provided with kneading projections 18. On the rotating motion of the screw, there is now superimposed an axially-reciprocating motion so that the screw blades 15 upon rotation pass through two kneading projections 18 arranged one behind the other in axial direction and upon the linear axial motion pass between two teeth 18 lying alongside of each other in the plane of the drawing of Figure 4. In this way, there is obtained an excellent mixing of the mass which is at first inhomogeneous with respect to the temperature distribution.

By the selection of suitable forms for the dies it is possible to control the particle size, the wall thickness, the speed of solution, and the bulkweight of the perborate obtained. The die shapes 3a to 3d give for instance relative compact perborate particles, as the speed of solution is dependent on the thickness of the particles. Die shapes in accordance with Figure 3e to 3i give perborates, the bulk weights of which are already less than those mentioned above due to the projections and irregularities present in the die profile. Die shapes in accordance with Figures 3k to 3n give perborates which combine high speeds of solution with low bulk weights.

The size of the perborate structures which are smaller in at least one dimension should advantageously be so selected that no perborate particles within this structure is more than 1.5 mm. from its nearest wall and preferably not more than 0.5 to 0.05 mm. The size of the die shapes is advisedly so selected that the greatest dimension of the die is not greater than the desired particle size of the perborates.

The perborate strands obtained in this manner are now cooled in any desired manner and possibly broken into pieces of desired particle size. These particle sizes may range from 0.09–10 mm., preferably from 0.3–5 mm. The cooling of the strands obtained can be effected on plates which are kept at room temperature or in a special cooling chamber until final cooling of the perborate. If the strands are allowed to emerge for instance vertically downward and if the downward hanging strands are cooled by cold air conducted against them, they will tear off at a given length. The emerging strands may however also be cut off by suitable devices, in which connection the length of the pieces may be very small, i.e. the length of these strands can lie within the order of magnitude of the dimensions of the die.

The division of the perborate strands into particles of desired length can however be effected directly after the production of the strands. For this purpose, scrapers can be caused to pass adjacent the mouthpiece of the extrusion press which cut off the extruded strands. The die 14 located at the end of the screw can also be replaced by a granulating drum. The latter, as shown in Figure 5, consists of a perforated drum 19 rigidly connected with the cylinder of the extrusion press, the material being forced into said drum by the screw 12 and thereupon emerging at the cylinder wall of the drum 19 in the form of small strands. In this case also the shape and size of the openings can be varied within the above indicated limits. To the shaft 13 of the screw press, there are fastened scrapers 20 which turn together with the shaft and moving over the surface of the granulating drum cut off the emerging perborate strands which are then further conducted to the cooling device. Of course, it is possible also to turn the granulating drum with the shaft of the screw press with the scrapers stationary or both the granulating drum and the scrapers can turn provided only that the relative motion between the scrapers and the cylinder surface or granulating drum necessary for the cutting off of the emerging perborate strands is maintained. The length of the emerging perborate strands can be varied for a given throughput of perborate by the relative velocity of the cylinder surface and scrapers, or by the number of scrapers. The strands or granulated material obtained in this manner can now be conducted on conveyor belts and cooled there. If the strands are brought onto the conveyer belts before they are cut up, the shape of the perborate granules can be varied by adjusting the speed of conveyance of the belt with respect to that of the extruded strand. If the conveyer belt moves with a higher speed than the emerging strand of shaped perborate, this strand will soon tear off. On the other hand, if the conveyor belt is operated at a lower speed than that of the emerging strand, the strands will bend or fold into structures which are similar to those of Figure 3n and there will be obtained particles, which, while of the same particle size, have a smaller bulk weight than preparations which have been prepared with larger speeds of the conveyor belt.

The cooling of the material is advisely effected by cold gas and particularly cold air. Air of a temperature of less than 50° C. and preferably of room temperature can be used.

The cooling can be effected by means of the aforementioned devices, for instance with plates, conveyer belts, etc., in which connection it is advisedly that the strands or particles produced in the screw press do not adhere together upon solidification. This is ideally possible only if the perborate strands or particles are spread out in a very thin layer on the support and even then there is a danger to a greater or lesser extent of the adhering together of the strands or particles so that a final comminution and/or classification by means of the devices described below is advisable if importance is placed on a product of uniform particle size.

In accordance with a preferred embodiment of the invention it has been found that these disadvantages can be extensively avoided if the cooling of the particles which have been brought to the desired particle size and are still in plastic state is effected by means of the fluidized bed process. For this purpose, the material to be cooled is brought into a vertical stream of gas, the velocity of which is sufficient to cancel the weight of the granules. Under these circumstances, a fluidized bed is formed in which the solid particles are held in suspension by the air flowing in the opposite direction. This fluidized bed acts like a boiling liquid and the material can be treated from the standpoint of method technique as a liquid, for instance drawn from one vessel into another. Within this fluidized bed, there takes place a very rapid heat transfer from the perborate particles to the gas flowing against same. The individual granules are separated from each other by a layer of air so that a sticking together of the granules cannot occur. The air stream carries the fines and dust particles out of the fluidized bed and small quantities of larger particles can be separated by a screen arranged in front of same.

For laboratory tests, there was used the apparatus shown in Figure 6.

It consists of a vertical, cylindrical glass tube 21 of a diameter of 2 cm., and a height of 10 cm. on which there is provided a further glass tube 22 of a diameter of 3.5 cm. and a height of 10 cm. The glass tube is tapered at its lower end and then passes into the air feed tube 23. At the place of taper, there is a fritted glass filter. Perborate is poured into the glass tube and the stream of air is so adjusted that the perborate is raised to a fluidized bed of desired height, for instance up to the dotted line 25.

For the industrial carrying out of the method, there is used the arrangement shown in Figure 7, which is based on the same principle. It consists essentially of the shaft 26 in which the fluidized bed is produced. This shaft tapers at its lower end and passes into the air feed line 27. At the place of taper, there is arranged a perforated tray 28. The lower part of the tube is surrounded by a temperature control jacket 29 through which a cooling agent can be conducted. The air flows through the perforated tray 28, lifts the perborate granules 30 lying thereon and produces a moving fluidized bed the height of which can reach up to the dotted line 31 depending on the velocity of the air. The perborate particles to be cooled can be brought into the cooling tube in any desired manner. It has been found particularly advisable to surround the granulating drum 33 of the extrusion press 32 with a hood 34 from which a pipe 35 extends into the cooling shaft 26. If the exit of the feed pipe 35 for the granules is so shaped that the opening lies within the shaft and faces away from the air flow a draft is produced in the pipe which very rapidly conveys the granulate into the cooling tube.

In the upper part of the fluidized bed, there is arranged a discharge pipe 37 for the granules which leads to a filling device or to the storage receptacle 39. At the inner wall of the cooling shaft 26, there is located, connected with same at the underside of the opening of the discharge pipe 37, a guide device which conducts the eddying granulate in the cooling tube into the discharge pipe 37. Since suction should be avoided as far as possible in pipe 37, it is advisable to develop the guide device 36, for aerodynamic reasons, not as a plate but rather as a sieve. The air leaves the tube 26 through the discharge line 38 and is, if necessary, conducted to a dust precipitator.

Figure 8 shows a further development of this device, having three perforated trays 41, 42 and 43 arranged in series in the cooling shaft 40 and having the cooling jacket 44 which extends practically over the entire length of the cooling shaft. The feed tube 45 for the granulate terminates above the uppermost perforated tray 43. From the higher perforated trays, vertical tubes 46 and 47, the upper edges of which lie a certain amount above the perforated trays, lead to the next lower perforated tray. These tubes determine the height of the fluidized beds 48 and 49 on the perforated trays since the higher liquidlike perborate mass which is fluidized in air drops through the tubes acting as overflow onto the next lower perforated tray and build up there into a new fluidized bed until the mass passes through the shaft to the lowest perforated tray. From the fluidized bed 50 located there, the perborate is conducted through the discharge line 51, possibly after passing through a screening device to the packing device or the storage container 52.

If a final comminuting of the cooled perborates is necessary, this is advantageously carried out in apparatus which produce only a careful breaking or crushing of the shaped structures but not a grinding into particles of undesired fineness. For this purpose, there can be used all disintegrating devices in connection with which removal of the particles ground to the desired particle size is effected by screens, gas currents or the like. There have proven particularly suitable grinding rolls which are arranged at a given distance apart and the surfaces of which possibly move at a different speed.

The classifying of the material can be effected in a customary manner, for instance with vibratory screens, air-sifters, etc.

If it is desired to reduce the bulk weight of the granular perborate still further, the water of crystallization can be removed from the granular products obtained by known methods. This is possible for instance by drying, in which connection, the granular material must not again be softened or melted. However, it is also possible to treat the granular perborates with organic solvents which are either miscible with water or are capable of taking up limited quantities of water, such as water-soluble alcohols, ketones or ethers. These solvents remove the water of crystallization from the perborate, particularly at elevated temperatures, without substantially affecting the shape of the particles.

*Example 1*

For the carrying out of the process in accordance with the invention, there was used a screw press of the type shown in Figure 2, having a screw and kneading projections as shown in Figure 4.

As starting material, there was used a finely granular crystalline perborate, the composition of which corresponded approximately to the formula $$NaBO_2 \cdot H_2O_2 \cdot 3H_2O$$

A heating liquid was passed through the jackets of the cylindrical housing and the hollow shaft and the apparatus was in this way heated to a temperature of about 50° C. The die of the screw press was heated by an electrical heater to about 55° C. Thereupon crystalline perborate was gradually charged into the filling hopper until the perborate emerged from the die in liquid state. The heating agent was then emptied from the tempering jacket lying closest to the die and the temperature of the die adjusted to 53 to 55° C. By the friction of the screw with the perborate in the part of the screw press facing the filling opening, there was produced so much heat that the heating in the first two tempering jackets could also be extensively reduced.

Perborate was converted into plastically deformable strands by this apparatus by the use of different shapes of dies. The perborate strands were conducted onto a conveyer belt and cooled on same by blowing with cold air of about 15 to 20° C. until completely solidified. The strands obtained in this manner were then charged for comminution into a beater mill having a stationary toothed rim and a rotating grinding wheel provided with projections. In the different experiments screen inserts with bores of 1–5 mm. diameter were used in the mill. The following table gives the forms of die used, their size, the screening fractions and the yield of material of desired particle size:

| Shape of Die in Accordance with Fig. | Size of Die in mm. | Screen Insert in the Mill, Diameter of Holes in mm. | Inside Diameter of the Vibratory Screen used for the Classification in mm. | Percent by Weight Granulate of the Indicated Part. Size |
|---|---|---|---|---|
| 3a | ⌀0.5 | 1 | 0.90 | 80 |
| 3a | ⌀0.5 | 2 | 1.08 | 85 |
| 3d | 0.35 x 3.5 | 1 | 1.08 | 70 |
| 3d | 0.35 x 3.5 | 2 | 1.08 | 87 |
| 3e | 0.5 | 5 | 1.08 | 80 |
| 3f | 1.0 | 2 | 1.08 | 83 |
| 3h | 0.3 x 4.5 | 1 | 0.09 | 60 |
| 3h | 0.3 x 4.5 | 2 | 1.08 | 82 |

The bulk weights of these granulated perborates were between 700 and 800 grams per liter. The bulk weight of the starting material was 550 to 650 grams per liter.

In another experiment, using a die in accordance with Figure 3d (0.35 x 3.5 mm.), there was produced a strand which was conducted onto a conveyer belt which moved at a speed equal to one-half the speed of the strand. In this way, the strand was transformed into a structure similar to that shown in Figure 3n. Upon the subsequent breaking, the curves of the strand were in part retained.

*Example 2*

For the carrying out of the process in accordance with the invention, there was employed a screw press according to Figure 2, modified according to Figures 4 and 5.

As starting material, there was used a finely granular, crystalline perborate the composition of which corresponded approximately to the formula $$NaBO_2 \cdot H_2O_2 \cdot 3H_2O$$

Through the jacket of the cylindrical housing and through the hollow shaft, a heating liquid was passed. The jacket part 11 in Figure 2 was heated to 55° C., and the jacket part 10 in Figure 2 and the hollow shaft 13 (Figure 2) to 45° C. Thereupon gradually crystallized perborate was added into the charging hopper 8 (Figure 2) until the perborate emerged in the form of small strands from the cylinder wall of the perforated drum 19 (Figure 5). The scrapers 20 fastened to the shaft 13 (Figure 5) and moving over the surface of the granulating drum cut the emerging perborate strands to the desired length of about 0.5 mm. For purposes of cooling, the granulate thus obtained which was still warm was charged into an apparatus according to Figure 6 which was provided as perforated trays with a fritted glass plate of a pore opening of 40 to 60μ. After the charging of 4.5 grams granulate of a temperature of 55° C., 560 cm.³ of air per second were conducted through the apparatus, which corresponded in tube 21 to a velocity of 1.8 meters per second. In one experimental series, there were determined the times of stay necessary with this arrangement in order to reach specific temperatures. The following granulate temperatures were obtained:

| Time of Stay of the Granulate in Seconds | Temperature of the Cooled Granulate in °C. |
|---|---|
| 5 | 32 |
| 35 | 30 |
| 60 | 28 |
| 130 | 27 |

The experiment shows that even very short times of stay are sufficient to cause the granulate to solidify.

In a prolonged test, the granulate was treated for 10 hours under the indicated conditions in the apparatus, in which connection it was found that no disintegration of the granulates formed could be noted.

When employing a granulate produced in the manner indicated above but of larger size, corresponding to a screen fraction between screens of 0.9 and 1.5 mm. free mesh width, a higher air velocity of about 3 meters per second was required.

*Example 3*

In order to carry out the process of the invention, there was used a screw press in accordance with Figure 2, with the embodiment of Figure 4.

As starting material, there was used a finely granular crystalline perborate, the composition of which corresponded approximately to the formula $NaBO_2 \cdot H_2O_2 \cdot 3H_2O$. Through the jackets 10 and 11 and through the hollow shaft 13 (Figure 2) there was passed a heating liquid and this part of the apparatus was warmed to a temperature of about 55° C. The die (Figure 3a) which served as closure member 14 (Figure 2) of the screw press, was heated to about 55° C. by an electric heater. Thereupon crystalline perborate was gradually added into the charging hopper 8 until the perborate emerged from the mold in liquid condition. Thereupon the heating of the jacket part 11 (Figure 2) was shut off and the temperature of the die adjusted to 53 to 55° C. Due to the friction of the worm with the perborate, sufficient heat was produced that the heating in the jacket part 10 (Figure 2) could also be extensively reduced.

By means of this apparatus, perborate was converted into plastically deformable strands which after a preliminary comminution passed through the tube 35 of the apparatus shown in Figure 7 for cooling onto the perforated tray 28. The lower part of the tube 26 is surrounded by a cooling jacket 29 through which water for instance of a temperature of 12° C. was passed. The air blown into tube 27 passed through the perforated tray 28, raised the pile of perborate particles and produced a moving fluidized bed, the height of which extended, a depending on the air velocity, up to the dotted line 31. Despite the essentially higher bulk weight of this granulate of 711 grams per liter, the air velocity of 1.8 meters per second was sufficient to maintain the fluidized condition of the granulate. After a time of stay determined by the content of the fluidized bed, the granulate left the cooler through the filling connection 37 for classification and filling.

*Example 4*

For the carrying out of the process in accordance with the invention there was employed a screw press in accordance with Figure 2, with the embodiments of Figures 4 and 5.

As starting material, there was employed a finely granular, crystalline perborate, the composition of which corresponded approximately to the formula $$NaBO_2.H_2O_2.3H_2O$$

Through the jacket of the cylindrical housing and through the hollow shaft a heating liquid was passed. The jacket part 11 in Figure 2 was warmed to 55° C. and the jacket part 10 in Figure 2 and the hollow shaft 13 in Figure 2 to 45° C. Thereupon crystalline perborate was gradually introduced into the charging hopper 8 (Figure 2) until the perborate emerged in the form of small strands from the cylinder wall of the perforated drum 19 (Figure 5). The scrapers 20 fastened to the shaft 13 (Figure 5) and moving over the surface of the granulating drum cut the emerging perborate strands to the desired length of about 0.5 mm. The scraped-off granules fed through the tube 45 onto the perforated tray 43 of the cooling tube 40 of the apparatus (Figure 8). Through the vertical tubes 46 and 47 acting as overflow the granulate flowed from the fluidized bed 48 to the fluidized bed 49 and 50. From the fluidized layer present there, the perborate was conducted through the discharge tube 51, possibly after passing through a screening device, to the filling device or storage container 52. The cooler, constructed in accordance with Figure 8, with three fluidized beds and a cooling jacket 44 extending over the entire height of the three fluidized beds has an extremely good cooling effect with a relatively long time of stay of the granule in the fluidized bed.

There was obtained a granulate of a bulk weight of 350–450 grams per liter which has a loose structure and an excellent solubility.

If it is desired to obtain a granulate of particularly low bulk weight and high speed of solution, the temperatures mentioned in Example 4 should not be exceeded. The holes of the granulating drum in this case should not exceed a diameter of 0.8 mm.

When the perborates to be processed according to the invention are wholly melted during the process, the particle sizes of the starting perborates is of no importance and there may be used perborates of any particle size. Of course, the particles must be small enough to be conveyed into the apparatus.

We claim:

1. Method for the conversion of finely granular perborates into a more coarsely granular form which comprises converting a finely granular perborate containing water of crystallization into a softened deformable mass under heat and pressure, without causing the same to melt, molding said mass into a plastically deformable structure having its greatest cross sectional size not substantially in excess of the grain size of the granular perborate to be produced and thereafter promptly solidifying molded perborate by cooling with a gas, and recovering granular perborate in said more coarsely granular form.

2. Method according to claim 1 in which said molded structure is broken up into granular form prior to said solidification by cooling.

3. Method according to claim 1 in which said molded structure is broken up into granular form after said solidification by cooling.

4. Method according to claim 1 in which said softened deformable mass is formed at an elevated temperature below 100° C.

5. Method according to claim 1 in which said perborate is $NaBO_2.H_2O_2.3H_2O$.

6. Method according to claim 1 in which said cooling is effected in a fluidized bed.

7. Method for the conversion of finely granular perborates into a more coarsely granular form which comprises converting a finely granular perborate containing water of crystallization into a softened deformable mass under heat and pressure, without causing the same to melt, extruding said mass into a narrow plastically deformable strand and thereafter promptly solidifying said narrow strands by cooling with a gas, and recovering granular perborate in said more coarsely granular form.

8. Method according to claim 7 in which said extruded strand is broken up into granular form after said solidifying by cooling.

9. Method according to claim 7 in which said extruded strand is broken up into granular form prior to said solidifying by cooling.

10. Method according to claim 9 in which said cooling is effected by maintaining the granular perborate particles in a fluidized bed with a cooling gas.

11. Method according to claim 7 in which said conversion is effected at an elevated temperature below 100° C.

12. Method according to claim 11 in which said perborate is $NaBO_2.H_2O_2.3H_2O$.

13. Method according to claim 7 in which said conversion under heat and pressure is effected in an extrusion press from which said narrow strand is extruded.

References Cited in the file of this patent

UNITED STATES PATENTS

| 2,257,461 | Gilbert et al. | Sept. 30, 1941 |

FOREIGN PATENTS

| 491,945 | Great Britain | Dec. 6, 1936 |
| 735,816 | Great Britain | Aug. 31, 1955 |
| 742,079 | Great Britain | Dec. 21, 1955 |